(12) United States Patent
Ramaswamy et al.

(10) Patent No.: US 8,399,139 B2
(45) Date of Patent: Mar. 19, 2013

(54) CORROSION RESISTANT MEMBRANE CONDENSER FOR RECOVERY OF FUEL CELL ELECTROLYTE

(75) Inventors: Sitaram Ramaswamy, West Hartford, CT (US); Eric J. Gottung, Chicago, IL (US)

(73) Assignee: UTC Power Corporation, South Windsor, CT (US)

( * ) Notice: Subject to any disclaimer, the term of this patent is extended or adjusted under 35 U.S.C. 154(b) by 97 days.

(21) Appl. No.: 13/140,368

(22) PCT Filed: Dec. 16, 2008

(86) PCT No.: PCT/US2008/013205
§ 371 (c)(1),
(2), (4) Date: Jun. 16, 2011

(87) PCT Pub. No.: WO2010/071615
PCT Pub. Date: Jun. 24, 2010

(65) Prior Publication Data
US 2011/0250514 A1    Oct. 13, 2011

(51) Int. Cl.
*H01M 8/06* (2006.01)
(52) U.S. Cl. ........................ 429/414
(58) Field of Classification Search .............. None
See application file for complete search history.

(56) References Cited

U.S. PATENT DOCUMENTS

| | | | |
|---|---|---|---|
| 3,222,223 A | 12/1965 | Platner | |
| 3,511,031 A | 5/1970 | Ketteringham et al. | |
| 4,037,024 A | 7/1977 | Landau | |
| 4,040,435 A | 8/1977 | Elzinga | |
| 4,372,759 A * | 2/1983 | Sederquist et al. | 95/228 |
| 4,504,285 A | 3/1985 | Modisette | |
| 4,533,607 A * | 8/1985 | Sederquist | 429/436 |
| 4,583,996 A | 4/1986 | Sakata et al. | |
| 4,699,892 A | 10/1987 | Suzuki | |
| 4,925,459 A | 5/1990 | Rojey et al. | |
| 5,104,425 A | 4/1992 | Rao et al. | |
| 5,611,931 A | 3/1997 | Liu et al. | |
| 6,039,792 A | 3/2000 | Calamur et al. | |
| 6,406,810 B1 * | 6/2002 | Konrad et al. | 429/415 |
| 6,464,755 B2 | 10/2002 | Nakanishi et al. | |
| 6,497,971 B1 | 12/2002 | Reiser | |
| 6,519,510 B1 | 2/2003 | Margiott et al. | |

(Continued)

FOREIGN PATENT DOCUMENTS

JP      9092315 A     4/1997

OTHER PUBLICATIONS

The International Search Report and Written Opinion of counterpart Application No. PCT/US2008/013205 filed Dec. 16, 2008.

(Continued)

*Primary Examiner* — Patrick Ryan
*Assistant Examiner* — Wyatt McConnell
(74) *Attorney, Agent, or Firm* — Kinney & Lange, P.A.

(57) ABSTRACT

A system and method for recovering and separating water vapor and electrolyte vapor from an exhaust stream (22) of a fuel cell uses a membrane tube (72) comprising membrane (74) having an outer wall (76) and an inner wall (78), wherein exhaust stream (22) is directed to contact outer wall (76), electrolyte vapor is condensed on outer wall (76), and water vapor is condensed inside the membrane (74), the condensed water drawn from the membrane (74) to inner wall (78), leaving behind condensed electrolyte (88) on outer wall (76).

20 Claims, 5 Drawing Sheets

U.S. PATENT DOCUMENTS

| | | |
|---|---|---|
| 6,716,275 B1 | 4/2004 | Reed et al. |
| 6,746,516 B2 | 6/2004 | Titmas |
| 6,832,647 B2 * | 12/2004 | Voss et al. .................. 165/111 |
| 7,066,396 B2 | 6/2006 | Knight et al. |
| 7,237,406 B2 | 7/2007 | Voss et al. |
| 2004/0115489 A1 | 6/2004 | Goel |

OTHER PUBLICATIONS

Gas Technology Institute articles obtained Sep. 18, 2008 from: http://www.gastechnology.org/webroot/app/xn/xd.aspx?it=enweb&xd..., 10 pages.

"Advanced membrane separation technologies for energy recovery: New transport membrane condenser recovers energy and water from industrial process streams", U.S. Department of Energy Energy Efficiency and Renewable Energy, Nov. 2007, 2 pages.

Lee, et al. "Synthesis and microstructures of silica-doped alumina composite membrane by sol-gel process", from Journal of Materials Science Letters, 18 (1999) p. 1367 only.

Paul K.T. Liu, "Gas Separations using Ceramic Membranes", from Media and Process Technology, Inc., Jan. 5, 2006, 53 pages.

* cited by examiner

CORROSION RESISTANT MEMBRANE CONDENSER FOR RECOVERY OF FUEL CELL ELECTROLYTE

BACKGROUND

The present disclosure relates in general to water and thermal management of fuel cell power plants, and more particularly, to a system and method for recovering water and electrolyte from an exhaust stream of a fuel cell using a corrosion resistant membrane condenser.

In the operation of a fuel cell, air or other oxidant is pumped in high volume through the cathode side of the fuel cell. In passing the cathode, the oxidant is depleted and water vapor is picked up by the oxidant depleted air and transported away from the cathode in a cathode exhaust stream. A substantial amount of electrolyte vapor is also dragged out of the fuel cell with the cathode exhaust stream because of the high operating temperature of the fuel cell which tends to vaporize the electrolyte. For example, phosphoric acid fuel cells are typically run at 400° F. (204° C.), producing phosphoric acid vapors. The recovery of the water vapor from the cathode exhaust stream is desirable because the water can then be recycled for uses including, for example, humidifying the fuel cell inlet gases, performing evaporative cooling of inlet gases, or supplying water for a steam reformer. However, if the phosphoric acid or other electrolyte is recovered with the water, it can become unusable for steam reforming purposes and can be corrosive to water condensing systems, thus shortening system life and requiring costly replacement of components.

SUMMARY

The present disclosure relates to a system and method for recovering and separating water vapor and electrolyte vapor from an exhaust stream of a fuel cell using a corrosion resistant membrane condenser. The exhaust stream is directed to contact a first side of a membrane of the condenser. Electrolyte vapor is condensed on the first side, water vapor is condensed inside the membrane, and the condensed water vapor is drawn from the membrane to a second side of the membrane.

DETAILED DESCRIPTION

Disclosed herein is a system and method for recovering and separating water vapor and electrolyte vapor from an exhaust stream of a fuel cell using a corrosion resistant membrane condenser. The system and method utilizes a membrane for not only recovering water vapor and electrolyte vapor from exhaust streams via condensation, but additionally for separating the condensed electrolyte vapor from the condensed water vapor, thereby preventing contamination of the water with potentially corrosive electrolytes such as phosphoric acid, and providing recovered pure water which may be collected and recycled for use in the fuel cell system. Accordingly, the system and method is more efficient than systems and methods requiring water condensers used in combination with separate structures for the removal of electrolyte vapor, including, for example, mist eliminators, high surface area condensers, and dry chemical removal systems. Under the system and method of the present disclosure, the remaining condensed electrolyte vapor may be collected for recycling, neutralization and proper disposal, or for re-injection into the fuel cell stack. Because the membrane condenser is made of corrosion resistant materials, for example ceramic materials, the shelf life of the condenser will be longer than typical metal condensers susceptible to corrosion that may be caused by electrolyte accumulation.

Figure 1:
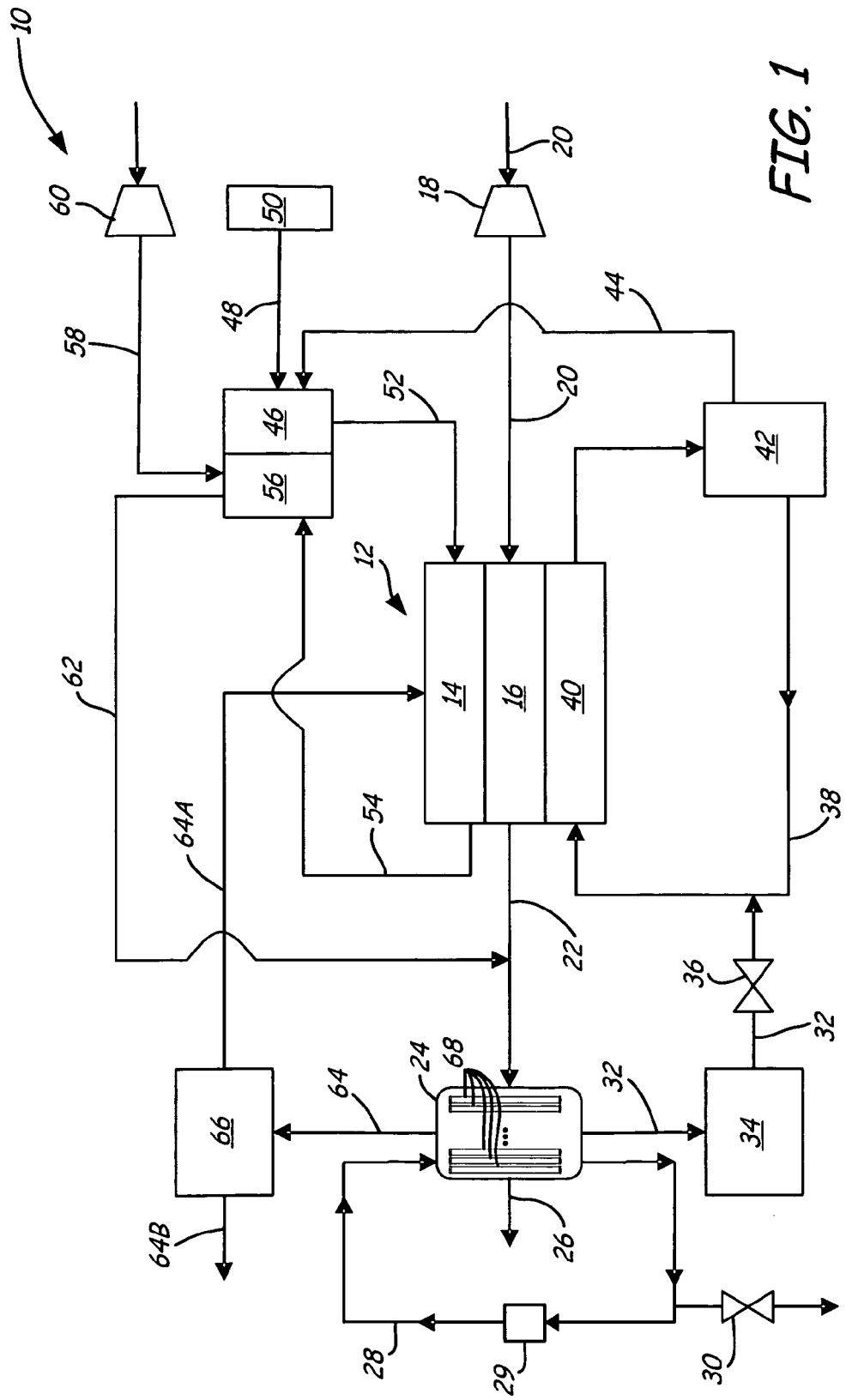
FIG. 1 is a schematic diagram of a fuel cell power plant.

FIG. 1 is a schematic diagram of a fuel cell power plant 10, including fuel cell 12, anode 14, cathode 16, blower 18, oxidant 20, fuel cell exhaust stream 22, membrane condenser 24, exhaust gas 26, condenser cooling loop 28, heat exchanger 29, drain valve 30, collected condensed water 32, water reservoir 34, valve 36, fuel cell cooling loop 38, cooler 40, steam reservoir 42, steam 44, reformer 46, fuel 48, fuel source 50, reformed fuel 52, fuel exhaust 54, burner 56, air 58, blower 60, burner exhaust 62, collected condensed electrolyte 64, electrolyte reservoir 66, reintroduced electrolyte 64A, disposed electrolyte 64B, and membrane tube bundles 68.

Fuel cell 12 comprises anode 14 and cathode 16. During operation of fuel cell power plant 10, blower 18 operates to pump a high volume of oxidant 20 through cathode 16. Cathode exhaust 22 comprising electrolyte vapor and water vapor is then introduced into membrane condenser 24. As described in further detail with regard to FIGS. 2-6, membrane condenser 24 comprises tube bundles 68 with membranes that may be used according to the system and method of the present disclosure to condense water vapor to liquid water, and electrolyte vapor into liquid electrolyte, with remaining gas 26 exhausted from condenser 24, for example.

Condensed water may join a cooling fluid stream inside the condenser (as described in more detail with reference to FIG. 4) and be pumped through a condenser cooling loop 28, for example. Condenser cooling loop 28 may comprise other components, including but not limited to heat exchanger 29, for example, and may also comprise drain valve 30 for keeping the volume of fluid in loop 28 constant as new condensed water is added to a cooling fluid stream inside condenser 24. Alternatively, collected condensed water 32 may be independently directed into water reservoir 34 (as described in more detail with reference to FIG. 5). From water reservoir 34, collected condensed water 32 may then be introduced in a controlled manner by valve 36 into fuel cell cooling loop 38. Water, including collected condensed water 32 introduced into fuel cell cooling loop 38, is cycled through loop 28 through cooler 40 for cooling fuel cell 12, and steam reservoir 42 for collecting steam generated by the hot temperatures of operating fuel cell 12 in addition to liquid water. The liquid water continues to be cycled through fuel cell cooling loop 38, and may also pass through other components not shown in FIG. 1, including but not limited to a heat exchanger, for example.

Steam 44 from steam reservoir 42 may be introduced into steam reformer 46 along with fuel 48 from fuel source 50. Reformed fuel 52 is directed through anode 14 of fuel cell 12, and fuel exhaust 54 is directed to burner 56 where it is mixed with air 58 pumped from blower 60 and burned to produce burner exhaust 62. Burner exhaust 62 may then be directed to join cathode exhaust stream 22 and subsequently directed past tube bundles 68 of membrane condenser 24 as shown in FIG. 1, or may be directed elsewhere, for example, the atmosphere. Burner 56 is shown thermally integrated with steam reformer 46 to assist in raising temperatures in reformer 46 to an adequate level for steam reformation to take place.

Collected condensed electrolyte 64 may be directed into electrolyte reservoir 66 (described in more detail with reference to FIG. 4 and FIG. 5). As shown in FIG. 1, collected condensed electrolyte 64 may be reintroduced 64A back into fuel cell 12, or may be disposed 64B for recycling, neutralization and proper disposal, or otherwise.

Figures 2, 3:
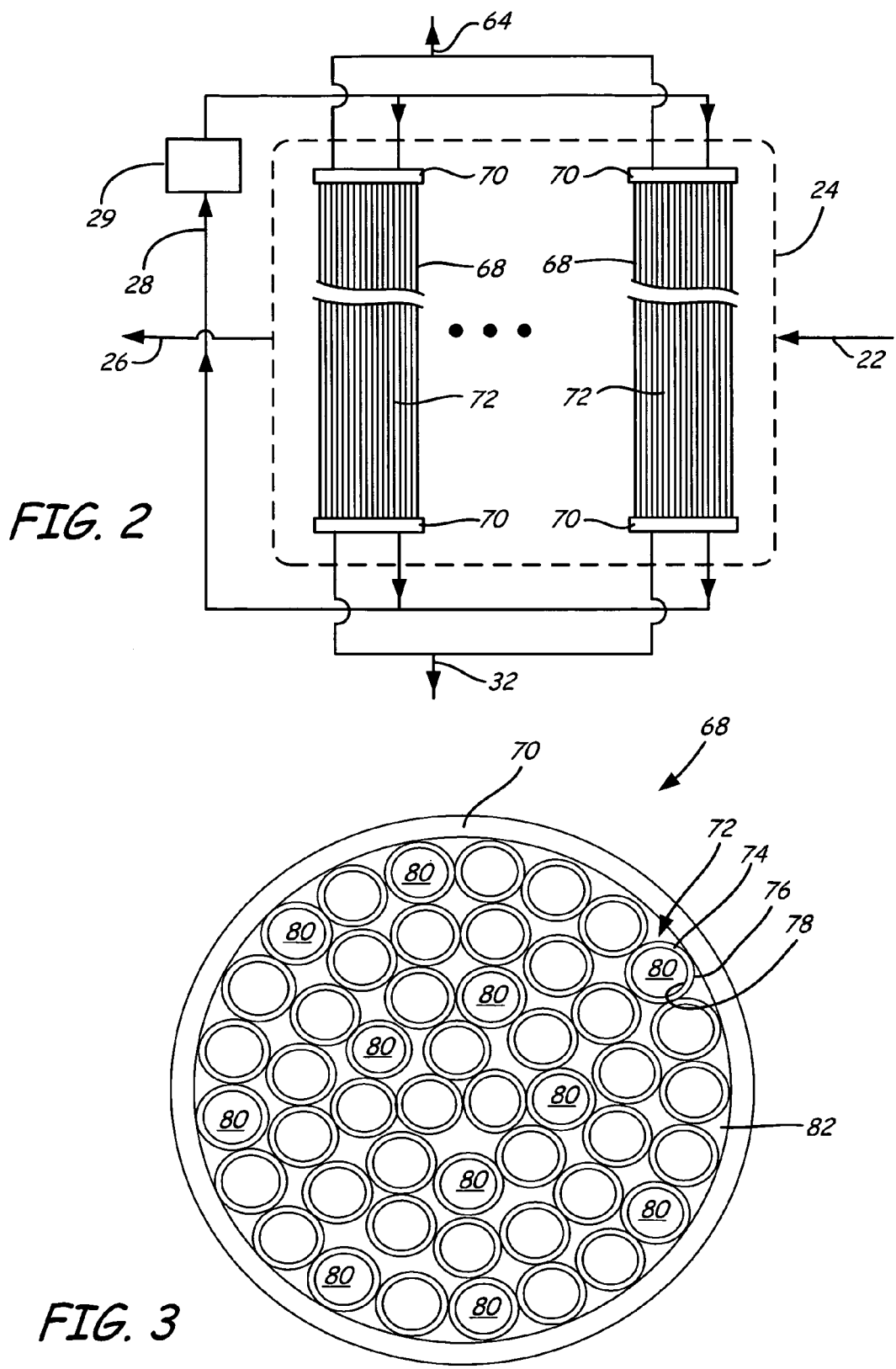
FIG. 2 is a side view of a membrane condenser showing condenser tube bundles inside the condenser.
FIG. 3 is an end view of a membrane condenser tube bundle.

FIG. 2 is a side view of membrane condenser 24 showing condenser tube bundles 68 inside condenser 24, each bundle 68 including sleeve 70 and membrane tubes 72. Sleeve 70 functions to hold membrane tubes 72 in the bundled configuration shown in FIG. 2 and FIG. 3. However, any system and method of securing multiple membrane tubes 72 together may be employed depending on the requirements of the condenser system to be used. A typical membrane condenser 24 may comprise multiple tube bundles 68 all contained within a housing, and tubes 72 may be of various sizes and configurations of corrosion resistant materials, for example, ceramics. Membrane tubes 72 suitable for use in the system and method taught by the present disclosure are available from CoorsTek, Inc. (www.coorstek.com). It may be appreciated that a manifold system (not shown) can be used to direct a gas flow path from fuel cell 12, such as cathode exhaust stream 22, into membrane condenser 24 and similarly to collect gas 26 to be exhausted from condenser 24. Additionally, manifolds could be used to direct liquids, such as water in loop 28, in and out of membrane condenser 24 and tube bundles 68, as well as for directing condensed liquids such as condensed water 32 or condensed electrolyte 64 away from tube bundles 68 and membrane condenser 24.

FIG. 3 is an end view of membrane condenser 24 tube bundle 68 including sleeve 70, and membrane tubes 72, each of which includes membrane 74, outer wall 76, inner wall 78, inner area 80, and outer area 82. During operation of the membrane condenser 24, a gas flow path from fuel cell 12, such as cathode exhaust stream 22, is directed through outer area 82 adjacent and between outer walls 76 of membrane tubes 72, while a cooling fluid is directed through inner area 80 as described in more detail with reference to FIG. 4.

Figure 4:
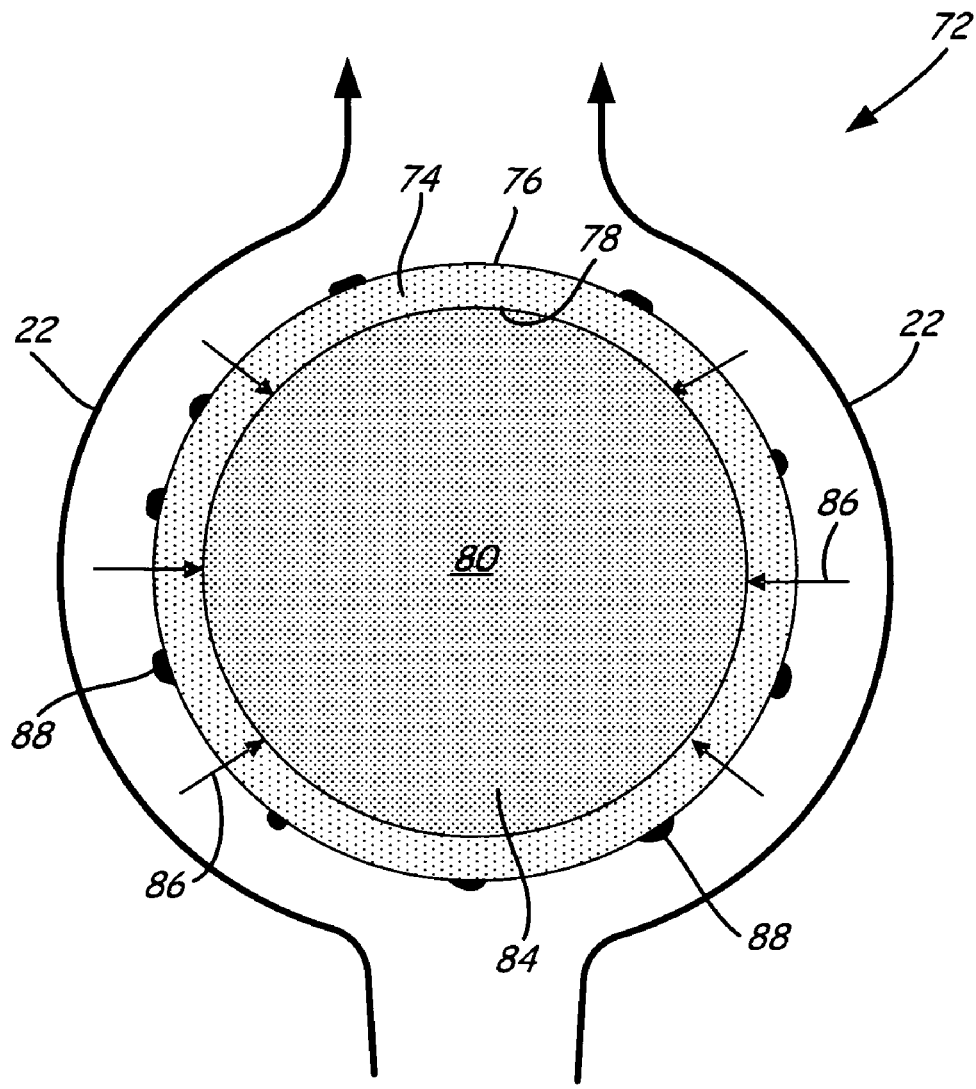
FIG. 4 is an end view of a membrane tube from FIG. 1, showing an embodiment according to the present disclosure.

FIG. 4 is an end view of one membrane tube 72 from FIG. 2, with a gas stream, such as cathode exhaust stream 22, directed to flow adjacent and in contact with outer wall 76 of membrane tube 72. However, it may be appreciated that any gas stream produced by a fuel cell may be directed to flow adjacent and in contact with outer wall 76 according to the system and method of the present disclosure. Cooling fluid 84, which may comprise water, for example, is directed through inner area 80 of membrane tube 72 to provide cooling of membrane 74. For a phosphoric acid fuel cell stack, cathode exhaust stream 22 will comprise heat, water vapor and phosphoric acid vapor, among other constituents. Due to the multilayered porous structure of membrane 74, the detail of which is described with reference to FIG. 6, water from cathode exhaust stream 22 will primarily condense inside the pores of membrane 74, rather than on outer wall 76. Due in part to the pressure gradient across the membrane established by the low partial pressure of cooling fluid 84 and high partial pressure of the water vapor in cathode exhaust stream 22, the water will travel across membrane 74 to inner wall 78 as designated by arrows 86, where it will join cooling fluid 84. Furthermore, heat present in cathode exhaust stream 22 will be convectively transferred with the water to cooling fluid 84, while the thermal gradient established across the membrane by the lower temperature cooling fluid 84 will also facilitate conductive heat transfer to cooling fluid 84, thereby cooling cathode exhaust stream 22. This heat may later be recovered by directing cooling fluid 84 through a typical heat exchanger, for example. Because membrane 74 allows for both convective and conductive heat transfer to occur, the effective surface area needed for removing and recovering sufficient heat from cathode exhaust stream 22 can be reduced when compared with non-membrane condenser systems. By reducing the effective surface area, the size, weight, and cost of the condenser may also be reduced.

FIG. 4 further shows condensed electrolyte 88 present on outer wall 76 of membrane tube 72. For a phosphoric acid fuel cell system, the condensed electrolyte 88 will be phosphoric acid, for example. By tailoring the porosity of membrane 74, as described in more detail with reference to FIG. 6, electrolyte vapor present in cathode exhaust stream 22 will not condense inside the pores of membrane 72, but rather, is forced to condense on outer wall 76 with a small amount of residual water. Because membrane 74 will only allow water to transfer across to inner wall 78, condensed electrolyte 88 such as phosphoric acid will remain on outer wall 76, with pure condensed water joining cooling fluid 84. Unlike metal condensers, membrane tube 72 made of corrosion resistant materials such as ceramic materials resists the corrosive effects of electrolyte 88 buildup, such as that typically caused by phosphoric acid condensation, and therefore imparts a longer shelf life to a condenser unit employing membrane tubes 72. Furthermore, as electrolyte 88 continues to condense on outer wall 76, it will form droplets containing substantially pure electrolyte such as phosphoric acid that can be collected into electrolyte reservoir 66 (shown in FIG. 1) for recycling, neutralization and proper disposal, or re-injection into fuel cell 12, for example. By re-injecting the collected electrolyte 88 into fuel cell 12, the life of fuel cell 12 and the overall fuel cell power plant 10 can be increased.

Figure 5:
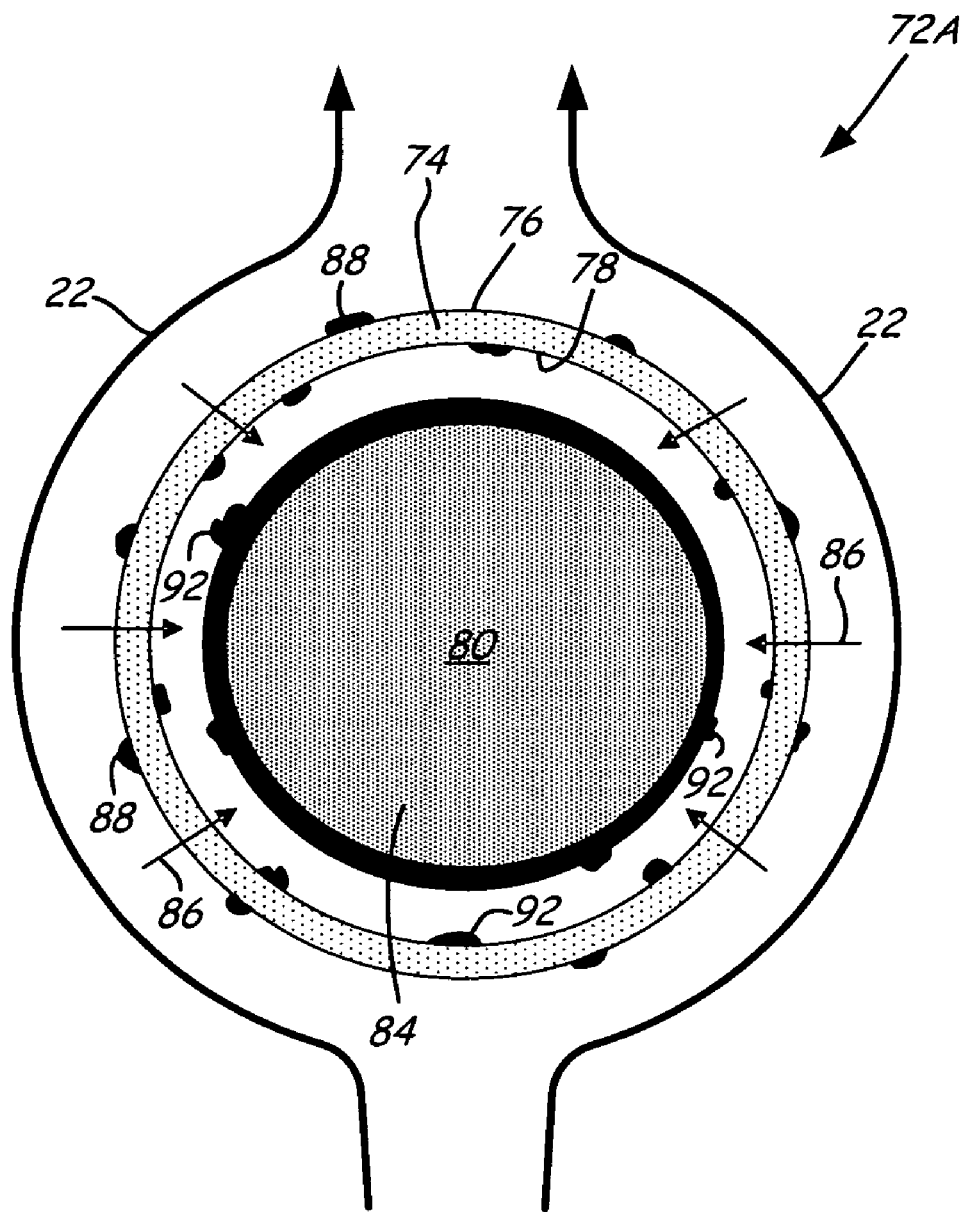
FIG. 5 is an end view of a membrane tube from FIG. 1, showing another embodiment according to the present disclosure.

FIG. 5 shows an end view of membrane tube 72A including an embodiment according to the system and method of the present disclosure, with inner cooling tube 90 in inner area 80. As discussed with reference to FIG. 4, water vapor present in cathode exhaust stream 22 will condense in the pores of membrane 74, however, some water vapor may also travel through membrane 74 without condensing, driven by the high partial pressure of the vapor, for example. In the embodiment shown in FIG. 5, water vapor that crosses membrane 74 will enter the space between inner cooling tube 90 and inner wall 78 of membrane tube 72A. By directing cooling fluid 84 through inner cooling tube 90, dew point temperatures may be established allowing the water vapor to condense on inner wall 78 and the outer surface of inner cooling tube 90, forming condensed water 92 droplets. The condensation of water in the space between inner cooling tube 90 and inner wall 78 will create a low partial pressure of water vapor in this space that will also help to facilitate the migration of water condensed in membrane 74 pores to inner wall 78, where it may join condensed water 92. Because the recovered condensed water 92 does not join cooling fluid 84, the system and method described with reference to FIG. 5 allows for independent control as to what may be done with the recovered condensed water 92. For example, condensed water 92 may be collected in water reservoir 34 (shown in FIG. 1) and then used for steam reformation, humidification of fuel cell reactants, controlled introduction into cooling fluid 84, or other uses. Furthermore, because inner cooling tube 90 will prevent water from joining cooling fluid 84, any type of cooling fluid 84 may be used in an isolated manner, including but not limited to glycol based coolants.

With regard to heat transfer from cathode exhaust stream 22, the cooling of the temperature in the space between inner cooling tube 90 and inner wall 78 will facilitate conductive heat transfer in addition to the convective heat transfer occurring with the migration of condensed water and water vapor across porous membrane 74. To ensure adequate heat transfer, inner cooling tube 90 should comprise a material having a high thermal conductivity, such as metal. To further facilitate thermal conductivity, inner cooling tube 90 may include surface features providing a high heat transfer area, for example, fins.

Figure 6:
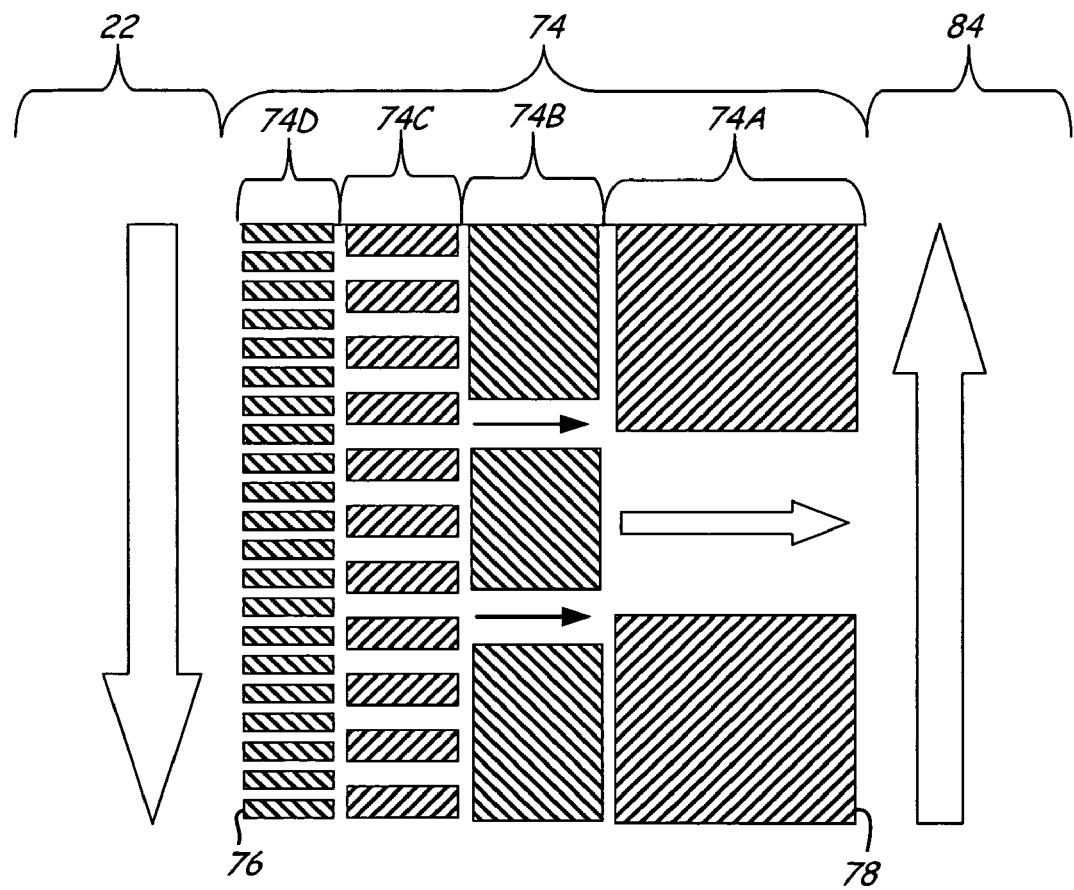
FIG. 6 is a cross section of a membrane.

FIG. 6 shows a cross section of membrane 74, including porous layers 74A, 74B, 74C, and 74D. Base support layer 74A is generally thick with large pores, providing mechanical strength to membrane 74 without significantly restricting flow of fluids through membrane 74, and defines inner wall 78 having pores open to cooling fluid 84, for example. Layer 74A may comprise, for example, $\alpha$-$Al_2O_3$ having a thickness of approximately 0.1 to 30 mm and a nominal pore size of approximately 10 to 15 microns. Although layers 74B, 74C, and 74D are shown in FIG. 5, any number of additional thin layers may be deposited on layer 74A with progressively smaller pore sizes. For example, layer 74B may comprise an $\alpha$-$Al_2O_3$ layer with around a 0.8 micron pore size and 0.01 to 0.02 mm thickness, and layer 74C may comprise an $\alpha$-$Al_2O_3$ layer with around a 0.2 micron pore size and a 0.01 to 0.02 mm thickness.

Separation layer 74D may be deposited on layer 74C with a pore size of less than 0.2 microns by known sol-gel membrane synthesis methods, and defines outer wall 76 having pores open to cathode exhaust stream 22, for example. In sol-gel membrane synthesis, the average pore size is determined by the primary particle size in the sol. Generally, the method involves preparing a sol from alkoxides of aluminum or zirconium, and depositing it on the ceramic membrane substrate (e.g., layer 74C) by a dipping or slip casting method. After drying and heat treatment, separation layer 74D will form the smallest pore size at a relatively low temperature, with the pore size generally increasing with the heat treatment temperature. Thus, depending on firing temperatures (which can range from 400° C. to 1400° C., for example), pore sizes of approximately 20 Angstroms to 0.2 microns may be obtained.

The actual pore size used for separation layer 74D may be determined based on the molecular size of the electrolyte to be excluded, with the selected size of the pore being smaller than the electrolyte, but larger than the molecular size of water, which has an extremely small molecular size of around 4 Angstroms. By selecting such a pore size, electrolyte molecules will be excluded via molecular sieving, and can then be forced to condense on outside wall 76 of membrane 74 by establishing the proper temperature and pressure conditions based on saturation vapor pressure qualities of the electrolyte. Proper temperature may be established by controlling the cooling fluid 84 temperature, and proper pressure may be established by controlling the pressure of cathode exhaust flow 22 via flow restrictors, pumps or valves, for example, to increase or decrease the partial pressure of electrolyte vapor to the necessary level. Once the proper conditions for condensation have been established, electrolyte vapor will condense on outside wall 76 of membrane 74, while a substantial amount of the water vapor will condense via capillary condensation (also known as "Kelvin condensation") inside the pores of separation layer 74D, as well as any other layers having sufficiently narrow pore sizes that may facilitate capillary condensation, for example, those with pore sizes ranging from approximately 40 to 100 Angstroms. Capillary condensation allows water to start to condense at lower vapor pressures than usual, resulting in an increase in water recovery relative to traditional condenser systems currently used with fuel cell stacks that do not employ membranes 74. The condensed water vapor will then migrate (designated by smaller arrows in FIG. 5) through layers 74C, 74B, and 74A via a capillary and partial pressure gradient across membrane 74 to inner wall 78, where it may join cooling fluid 84, for example.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

The invention claimed is:

1. A method comprising:
operating a fuel cell to produce an exhaust stream comprising an electrolyte vapor and a water vapor; and
separating the electrolyte vapor and the water vapor from the exhaust stream using a membrane condenser, comprising:
directing the exhaust stream to contact a first side of a membrane of the condenser;
condensing the electrolyte vapor on the first side of the membrane;
condensing the water vapor inside the membrane; and
drawing the condensed water from the membrane to a second side of the membrane.

2. The method of claim 1, wherein the membrane comprises ceramic material.

3. The method of claim 1, further comprising collecting the condensed electrolyte vapor.

4. The method of claim 1, further comprising collecting the condensed water from the second side of the membrane.

5. The method of claim 1, wherein the membrane comprises multiple porous layers.

6. The method of claim 5, wherein at least one of the porous layers comprises pores having a pore size of approximately 40 to 100 Angstroms.

7. The method of claim 6, wherein one of the multiple porous layers adjacent the first side of the membrane comprises pores having a pore size smaller than a molecular size of the electrolyte, but larger than a molecular size of the water.

8. A method comprising:
operating a fuel cell to produce a cathode exhaust stream comprising electrolyte vapor, water vapor and heat;
operating a condenser in fluid communication with the fuel cell to recover heat from the cathode exhaust stream, the condenser comprising at least one membrane tube having an outer wall and an inner wall, with multiple porous layers between the outer wall and inner wall, pores of the multiple porous layers having pore sizes that generally increase from the outer wall to the inner wall of the membrane tube; and
separating the electrolyte vapor and the water vapor from the cathode exhaust stream with the condenser, comprising:
directing the cathode exhaust stream to contact the outer wall of the membrane tube;
condensing the electrolyte vapor on the outer wall of the membrane tube;

condensing the water vapor within the porous layers; and drawing the condensed water from the porous layers to the inner wall of the membrane tube, leaving behind the condensed electrolyte on the outer wall of the membrane tube.

9. The method of claim 8, wherein the electrolyte comprises phosphoric acid, and wherein the membrane tube comprises a ceramic material.

10. The method of claim 8, wherein a cooling tube containing cooling fluid is positioned inside the membrane tube to create a space between the inner wall of the membrane tube and an outer wall of the cooling tube.

11. The method of claim 10, wherein using the condenser to recover and separate the electrolyte vapor and the water vapor from the cathode exhaust stream includes condensing water vapor inside the space between the inner wall of the membrane tube and the outer wall of the cooling tube.

12. The method of claim 11, wherein separating the electrolyte vapor and the water vapor from the cathode exhaust stream with the condenser includes collecting condensed water on the inner wall of the membrane tube and in the space between the inner wall of the membrane tube and the outer wall of the cooling tube.

13. The method of claim 8, wherein a porous layer adjacent the outer wall of the membrane tube comprises pores having a pore size smaller than a molecular size of the electrolyte, but larger than a molecular size of the water.

14. A system comprising:
a fuel cell for producing an exhaust stream comprising electrolyte vapor and water vapor; and
a condenser connected to the fuel cell to receive the exhaust stream, the condenser comprising a porous membrane having a first side, a second side, and pores configured to condense the water vapor within the pores and condense the electrolyte vapor on the first side.

15. The system of claim 14, wherein the electrolyte is phosphoric acid, and wherein the membrane comprises ceramic material.

16. The system of claim 15, wherein the condenser is configured to draw the condensed water vapor to the second side, leaving behind the condensed phosphoric acid on the first side.

17. The system of claim 14, further comprising a condenser cooling loop connected to the condenser, the condenser cooling loop containing a cooling fluid for cooling the porous membrane.

18. The system of claim 17, wherein the cooling fluid is in contact with the second side of the porous membrane, and the condensed water vapor joins the cooling fluid at the second side.

19. The system of claim 16, further comprising a water reservoir for collecting the condensed water from the second side of the porous membrane.

20. The system of claim 14, wherein the porous membrane comprises multiple porous layers.

* * * * *